United States Patent [19]

Kowalski et al.

[11] Patent Number: 4,469,825

[45] Date of Patent: Sep. 4, 1984

[54] SEQUENTIAL HETEROPOLYMER DISPERSION AND A PARTICULATE MATERIAL OBTAINABLE THEREFROM, USEFUL IN COATING COMPOSITIONS AS AN OPACIFYING AGENT

[75] Inventors: Alexander Kowalski, Plymouth Meeting; Martin Vogel, Jenkintown, both of Pa.

[73] Assignee: Rohm and Haas Company, Philadelphia, Pa.

[21] Appl. No.: 473,507

[22] Filed: Mar. 9, 1983

[51] Int. Cl.$^3$ .............................................. C08L 0/00
[52] U.S. Cl. .................................... 523/201; 524/812; 525/293; 525/296; 525/902; 427/385.5
[58] Field of Search ........................ 523/201; 524/812; 525/293, 296, 902; 427/385.5

[56] References Cited

U.S. PATENT DOCUMENTS 4,304,703 12/1981 Das ....................................... 525/293

FOREIGN PATENT DOCUMENTS 0022633 6/1980 European Pat. Off. .

Primary Examiner—Joseph L. Schofer
Assistant Examiner—J. M. Reddick
Attorney, Agent, or Firm—Michael B. Fein

[57] ABSTRACT

The present invention is concerned with the production and use of water-insoluble particulate heteropolymers made by sequential emulsion polymerization in dispersed particles of which a "core" of a polymeric base is at least partially encased in a "sheath" polymer that is permeable to an acid, such as acetic acid, adapted to cause swelling of the core by neutralization. The aqueous dispersion of the acid-swollen, base-containing core/sheath particles is useful in making water-base coating compositions, microvoids being formed in cores of the swollen particles in the film during the drying thereof. Thus, the heteropolymer dispersion can serve as an opacifying agent in coating compositions, such as water-base paints, as a supplement or replacement of part or all of the pigmentary material or extenders that would otherwise be used in such coating compositions.

For convenience of description herein, the terms "core", "sheath", and "core/sheath polymer" are frequently used to refer to the distinct functional components of the individual polymer particles of the essential "mode" of the heteropolymers of the present invention even though in actuality, the components of the polymer particles thereof may not have the precise arrangement implied by this terminology.

12 Claims, No Drawings

SEQUENTIAL HETEROPOLYMER DISPERSION AND A PARTICULATE MATERIAL OBTAINABLE THEREFROM, USEFUL IN COATING COMPOSITIONS AS AN OPACIFYING AGENT

It has heretofore been suggested to make microvoid-containing polymer particles to serve as hiding or opacifying agents in coating and molding compositions. Among the various procedures heretofore used, organic solvents and blowing agents occupy a prominent place therein.

Kreider U.S. Pat. No. 3,819,542, though containing no disclosure of the production of microvoid-containing polymer particles to serve as opacifying agents in coating compositions, is of background interest to show the use of organic solvents in a latex coating composition to produce a cellular film on drying. More specifically Kreider uses a mixture of a primary organic solvent, such as xylene, immiscible with the aqueous phase of the latex coating composition and a secondary organic solvent, such as propylene glycol, at least partially water-miscible and having lesser volatility and lesser solvating capacity for the polymer in the latex than the primary solvent. Upon evaporation of the primary solvent, a cellular film is obtained, the secondary solvent increasing the opacification. Kershaw et al, U.S. Pat. No. 3,891,577, prepares a vesiculated polymer by converting to a solid polymer a liquid medium containing dispersed therein particles of another polymer swollen by a liquid swellant, the liquid swellant then being at least partially removed from the disperse polymer particles. The liquid medium may be converted to a solid by removal of solvent, e.g., from a solution of a solid polymer, or preferably by polymerization of a monomer or comonomers or an oligomer or a mixture of these. Optionally a dissolved polymer may be present in the liquid to be polymerized. Solidification of the liquid in which the swollen particles are dispersed and removal of the swellant is then carried out to provide the vesiculated polymer, which may be in massive form, as a film, or in the form of a coating applied to a substrate.

In another Kershaw et al embodiment, the dispersion of swollen polymer in the liquid medium may itself be dispersed in a further liquid in which it is insoluble. The further liquid is referred to as the suspending liquid. Solidification of the medium is then carried out and after separation of the granules so formed from the suspending liquid, liquid swellant may be removed from the swollen polymer to provide vesiculated polymer in granular form. Alternatively, when, for example, the vesiculated granules are to be used in a coating composition with which the suspending liquid is compatible, the granules formed by solidification of the medium may be incorporated into the composition as a slurry in at least part of the suspending liquid. On applying the composition to a substrate, formation of a coating film and removal of swellant from the swollen disperse polymer to form the vesicles within the granules then take place concurrently.

Whereas Kershaw et al disclose a wide range of swellable disperse polymers including those containing base groups that would be swollen by water having a pH less than 7, e.g. water containing formic acid, and whereas it mentions that aqueous emulsion polymerization can be used to make the swellable polymer particles in a latex that can be added to a water-miscible medium to be solidified or that can be dried to form particles that can be redispersed in such a medium, nevertheless, the patent primarily depends on the process of dispersion (non-aqueous) polymerization to prepare the swellable polymer particles as pointed out in column 5, lines 28 to 53, and elsewhere in the general description, as well as in most, if not all the working examples of the patent. Such procedures are generally complicated and involve the use of organic solvents with the attendant health and fire hazards as well as the need to provide expensive solvent exhaust and/or recovery systems. Furthermore, this patent is limited to granules containing a plurality of microvoids (column 20, lines 1 to 11) whereas we have discovered that for optimum paint opacity and other paint properties it is more desirable to have a single microvoid per granule (particle).

Canadian Patent No. 888,129 discloses the preparation of a two-stage latex dispersion of particles having a core containing a blowing agent and an encapsulating layer. The particles are subsequently heated to develop gas and foam the particles.

Krieg et al, U.S. Pat. No. 3,914,338, discloses the production of opalescent polymer particles for use in polymethyl methacrylate molding compositions consisting of a core of a crosslinked styrene emulsion polymer of a particle diameter of at least 0.8 micron and having grafted thereon, as by a subsequent stage of emulsion polymerization, a sheath of a methyl methacrylate polymer. Opalescence apparently depends on the different refractive indices of the core and sheath.

Kowalski et al, European Patent Application No. 22,633, prepares a water insoluble polymer by sequential emulsion polymerization in which an acid polymer core is encased in a sheath polymer. The core/sheath particles are swollen with volatile base such as ammonia and form microvoids in the particles upon drying to act as an opacifier. However the high pH of these polymer dispersions as made, pH 9 to 10, creates problems with coating systems that are not stable in the presence of base such as those based on poly(vinyl acetate) latex binders or those containing glycidyl ether crosslinking functionality. The polymer dispersions of Kowalski et al are not very useful for acid-catalyzed thermosetting coatings because the high base content of the polymer dispersions can interfere with the acid-catalyzed curing reactions.

DESCRIPTION OF THE INVENTION

In accordance with the present invention, sequential emulsion polymerization in an aqueous medium has been applied to the formation of an aqueous dispersion of water-insoluble hetero-polymer particles comprising (1) an ionic core polymer containing ionizable base groups making the core swellable by the action of a swelling agent consisting essentially of an aqueous liquid or a gaseous medium containing acid to at least partially neutralize (to a pH of at least about 8 to 1) the base core polymer and thereby to cause swelling by hydration thereof and (2) a sheath polymer on the core, the sheath being permeable to the swelling agent. The composition of sheath polymer is such as to render it permeable at ambient temperature (e.g. at room temperature of about 20° C.) or at moderately elevated temperature, such as up to about 80° C. to about 120° C., to a neutralizing acid, such as formic acid, to allow swelling of the base core polymer by such acids in aqueous or gaseous media.

The term "sequentially emulsion polymerized" or "sequentially emulsion produced" refers to polymers (which term includes copolymers as well as homopolymers) which are prepared in aqueous medium by an emulsion polymerization process wherein the dispersed polymer particles of a preformed latex or "seed" polymer in the aqueous medium are increased in size by deposition thereon of polymerized product of one or more successive monomer charges introduced into the medium containing dispersed particles of the preformed latex in one or more subsequent stages. When there is no additional emulsifier (or surfactant) introduced with the subsequent monomer charges, essentially no additional micelles are formed during the subsequent stages of polymerization and practically all of the monomer charges added later polymerize onto the latex polymer particles present at the time of charging and the resulting polymer product may appropriately be called a "unimodal" sequentially polymerized heteropolymer. However, a "polymodal", for instance a "dimodal", "trimodal", or "multimodal" heteropolymer may be obtained by introducing additional emulsifier or surfactant with one (to produce a dimodal) or more (to produce tri-, tetramodal, etc.) of the subsequent charges. In such instances, the monomer charge accompanied by additional surfactant is partly polymerized on the dispersed polymer particles already present and partly polymerized on the additional micelles created by the additional surfactant, the relative proportion of the monomer charge contributing to the two effects being generally related to the amount of surfactant added with the monomer charge.

In this type of polymerization, all of the monomer of each succeeding stage or phase is attached to and intimately associated with the dispersed particles resulting from the immediately preceding stage or phase when no additional surfactant is added in the subsequent stages. When additional micelle-forming surfactant is added in a particular monomer charge, part of the monomer in the charge is so attached and intimately associated with the polymer particles present in the system at the time of monomer/surfactant addition and part produces additional dispersed particles, yielding a multimodal heteropolymer. Although the exact nature of this attachment is not known, and while it may be chemical or physical or both, the sequentially prepared polymers or copolymers of the present invention are characterized by and or made by a process in which the total particle content is substantially predetermined, in terms of number, by the use of a preformed latex to provide an initial dispersed particle content and either (1) avoiding the addition of surfactant with the subsequent monomer charges whereby a monomodal or unimodal heteropolymer is obtained containing essentially the same number of dispersed polymer particles as the initial latex or (2) incorporating a limited amount of additional emulsifying surfactant in one or more of the subsequently added monomer charges to produce a multimodal or polymodal polymer dispersion in which the number of dispersed polymer particles derived by attachment or initimate association with the dispersed polymer particles of the initial or seed latex is the essential or significant mode by virtue of its "large-size" particles and the dispersed polymer particles produced on other micelles formed by including surfactant in one or more of the subsequent monomer charges provide a second and/or third, and so on mode, all such additional modes, whether one, two, three, or more being relatively insignificant with respect to the essential mode. In multimodal polymers made in accordance with the present invention, the essential or "large-size particle" mode constitutes at least about 25% of the total amount of dispersed polymer particles in terms of weight. A preferred embodiment of multimodal product is a bimodal polymer in which the essential or significant mode derived from the dispersed particles of initial, preformed seed latex constitutes at least about 75% to 85% of the total weight. The essential mode may simply be referred to as the "main" mode regardless of the proportion of such mode in multimodal dispersion because it is the significant mode, but in the preferred embodiment the essential mode or main mode is also the predominant mode. The first stage of monomer charge containing additional surfactant to prepare a multimodal product may be at the time of any of the successive monomer charges after at least about 10% to 50% by weight of the total monomer or monomers to be polymerized on the particles of the initial preformed latex have been so polymerized.

In the multistage sequential emulsion polymerization with which the present invention is concerned, the term "seed" polymer is used to refer to an aqueous emulsion polymer dispersion which may be the initially-formed dispersion, that is the product of a single stage of emulsion polymerization or it may be the emulsion polymer dispersion obtained at the end of any subsequent stage except the final stage of the sequential polymerization. Thus, an acid swellable polymer which is herein intended to be provided with a sheath by one or more subsequent stages of emulsion polymerization may itself be termed a seed polymer for the next stage wherein the sheath-forming polymer is deposited on such seed polymer particles.

The core polymer may be the product of aqueous emulsion polymerization of one or more monoethylenically unsaturated monomers containing a group of the formula —HC=C< and an amine group or a polyethylenic amine if it polymerizes as monoethylenic such as an amino substituted butadiene. Suitable amine monomers include vinyl pyridine, 2-(dimethylamino)ethyl (meth)acrylate, 2-(tert-butylamino)ethyl (meth)acrylate, 3-(dimethylamino)propyl (meth)acrylamide, 2-(diethylamino)ethyl (meth)acrylate and 2-(dimethylamino)ethyl (meth)acrylamide.

The core polymer may be obtained by the emulsion homopolymerization of such an amine monomer or by copolymerization of two or more amine monomers. However, in preferred embodiments, an amine monomer or a mixture of amine monomers is copolymerized with one or more ethylenically unsaturated monomers of non-ionic character (that is, having no ionizable group) having one or more ethylenic unsaturated groups of the formula $H_2C=C<$.

Examples of nonionic monoethylenically unsaturated monomers include styrene, vinyltoluene, p-methylstyrene, ethylene, vinyl acetate, and other vinyl esters, dibutyl maleate and other maleate esters, vinyl chloride, vinylidiene chloride, ethylene, acrylonitrile, methacrylonitrile, (meth)acrylamide and substituted (meth)acrylamides, various $(C_1-C_{20})$alkyl or $(C_3-C_{20})$alkenyl esters of (meth)acrylic acid, (the expression (meth)acrylic acid is intended to serve as a generic expression embracing both acrylic acid and methacrylic acid) e.g., methyl methacrylate, methyl acrylate, ethyl (meth)acrylate, butyl (meth)acrylate, 2-ethylhexyl (meth)acrylate, benzyl (meth)acrylate, lauryl (meth)acrylate oleyl (meth)acrylate, palmityl (meth)acrylate, and stearyl (meth)acrylate. In general, core polymers containing at least about 5%, preferably at least 10%, by weight of amine mers have practical swellability for the purposes of the present invention but there may be instances wherein, because of the hydrophobicity of certain comonomers or combinations thereof in conjunction with the hydrophobic/hydrophilic balance of a particular acid monomer, the copolymer may require somewhat less than 5 weight percent of amine monomer or considerably more than 5 weight percent thereof, and in the latter instance, a preferred proportion of amine monomer is at least 10 weight percent based on the total weight of core-producing monomer mixture. As may be seen by the reference to homopolymerization of an amine monomer core, the invention includes a core which contains 100% of the addition polymerizable amine. A preferred maximum quantity of amine monomer is about 70% of the total core monomers, by weight.

The core polymer may comprise as one component thereof a small amount of polyethylenically unsaturated monomer, such as ethylene glycol di(meth)acrylate, allyl (meth)acrylate, 1,3-butane-diol di(meth)acrylate, diethylene glycol di(meth)acrylate, trimethylolpropane trimethacrylate, or divinylbenzene, divinyl adipate, diallyl phthalate, the proportion thereof being in the range of about 0.1% to 20%, preferably 0.1% to about 3%, by weight, based on the total monomer weight of the core, the amount used generally being approximately directly proportional to the amount of amine monomer used. Butadiene is exceptional in that it often functions as a monoethylenically unsaturated monomer especially in mixtures with styrene so the amount of butadiene, if used, may be as much as 30 to 60 percent by weight of the total core monomer weight.

While the core may be made in a single stage or step of the sequential polymerization and the sheath may be the product of a single sequential stage or step following the core stage, nevertheless, the making of the core component may involve a plurality of steps in sequence followed by the making of the sheath which may involve a series of sequential steps as well.

Thus, the first stage of emulsion polymerization in the process of the present invention may be the preparation of a seed polymer containing small dispersed polymer particles insoluble in the aqueous emulsion polymerization medium. This seed polymer may or may not contain any amine component, but provides particles of minute size which form the nuclei on which the core polymer of amine monomer, with or without nonionic comonomer(s), is formed.

As is common to aqueous emulsion polymers, there is used a water-soluble free radical initiator, such as hydrogen peroxide, tert-butyl peroxide, or an alkali metal (sodium, potassium or lithium) or ammonium persulfate or a mixture of such an initiator with a reducing agent, such as sulfite, more specifically an alkali metal metabisulfite, hydrosulfite, or hyposulfite, or sodium formaldehyde sulfoxylate, to form a redox system. The amount of initiator may be from 0.01 to about 2% by weight of the monomer charged and in a redox system, a corresponding range (0.01 to about 2%) of reducing agent may be used. The temperature may be in the range of about 10° C. to 100° C. In the case of the persulfate systems, the temperature is preferably in the range of 60° to 90° C. In the redox system, particularly the film-forming thickener products, the temperature is preferably in the range of 30° to 70° C., preferably below about 60° C. the proportion of emulsifier may be zero, in the situation wherein a persulfate initiator is used, to about 0.3 weight percent, based on the weight of monomer charged to the first stage of polymerization. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low. However, as pointed out hereinabove, polymodal products may be obtained by including an emulsifier or surfactant in one or more of the later monomer charges.

Any nonionic, anionic or cationic emulsifier may be used, either alone or together. Examples of the nonionic type of emulsifier include tert-octylphenoxyethylpoly(39)-ethoxyethanol, and nonylphenoxyethylpoly(4-0)ethoxyethanol. Examples of anionic emulsifiers include sodium lauryl sulfate, sodium dodecyl benzene sulfonate, sodium tertoctylphenoxyethoxypoly(39)ethoxyethyl sulfate, and coconut oil fatty acid, sodium salt.

The molecular weight of the polymer formed in a given stage may range from 100,000, or lower if a chain transfer agent is used, to several million viscosity average. When 0.1 to 20 weight % of a polyethylenically unsaturated monomer mentioned hereinbefore is used in making the amine polymer, the molecular weight is increased whether or not crosslinking occurs. The use of the polyethylenically unsaturated monomer reduces the tendency of the core polymer to dissolve when the multistage polymer is treated with a swellant for the core. If it is desired to produce an amine polymer having a molecular weight in the lower part of the range, such as from 500,000 down to as low as about 20,000, it is frequently most practical to do so by avoiding the polyethylenically unsaturated monomers and using a chain transfer agent instead, such as 0.05 to 2% or more thereof, examples being a lower alkyl mercaptan, such as sec-butyl mercaptan.

The amine containing core polymer, whether obtained by a single stage process or a process involving several stages, has an average size of about 0.05 to about 1.0, preferably 0.1 to 0.5, micron diameter in unswollen condition. If the core is obtained from a seed polymer, whether or not the latter contains amine groups or mers, the seed polymer may have an average size in the range of 0.03 to 0.2 micron diameter.

After the amine is obtained, a subsequent stage or stages of emulsion polymerization is effected to form a sheath polymer of the amine core polymer particles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the sheath, the tendency to produce gum or coagulum in the reaction medium may be reduced or prevented by the addition of about 0.05 to about 0.5% by weight, based on sheath-forming monomer weight, of emulsifier without detriment to the deposition of the polymer formed on the previously formed core particles.

The monomers used to form the sheath polymer on the amine core particles may be any of the nonionic monoethylenically unsaturated comonomers mentioned hereinbefore for the making of the core. The monomers used and the relative proportions thereof in any copolymers formed should be such that the sheath thereby formed is readily permeable to an aqueous or gaseous acidic swellant for the amine core. In spite of their hydrophobicity, the extremely non-polar or low-polar monomers, namely, styrene, α-methyl styrene, vinyl toluene, ethylene, vinyl chloride and vinylidene chloride are useful alone or in admixture with more highly polar monomers in the list, such as vinyl acetate. Monomeric mixtures for making the sheath may contain up to about 10% by weight, but preferably not over 5% by weight, of an amine monomer, such as one of the monomeric amines mentioned hereinbefore for making the core. The content of amine monomer serves either or both of two functions, namely stabilization of the final sequential polymer dispersion and assuring permeability of the sheath to an acid swellant for the core.

The amount of polymer deposited to form sheath polymer is generally such as to provide an overall size of the multistage polymer particle of about 0.07 to about 4.5 microns, preferably about 0.1 to about 3.5 microns, more preferably about 0.2 to about 2.0 microns, in unswollen condition (that is, before any neutralization to lower the pH to about 8 or below) whether the sheath polymer is formed in a single stage or in a plurality of stages. In unswollen state, the ratio of core weight to the total weight on average is from 1:4 to 1:100. After volatilization of the water from the enlarged swollen particle, to produce a microvoid therein, the ratio of void volume to total volume of the particle on average should be from about 5% to 95% and preferably is at least 15%. Generally, a single void is formed in each particle.

The multistage heterogeneous particulate polymer containing the amine core is swollen when the particles are subjected to an aqueous acidic swellant that permeates the sheath and expands the core, which expansion may involve partial merging of the outer periphery of the core into the pores of the inner periphery of the sheath and also partial enlargement or bulging of the sheath and the entire particle overall. When the swellant is removed by drying, the shrinkage of the core tends to develop a microvoid, the extent of which depends on the resistance of the sheath to restoration to its previous size.

The monomer or monomers of the sheath should be selected to produce a sheath polymer having a relatively moderate to high glass transition temperature, $T_i$. $T_i$ is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm².

It is preferred, for formation of microvoids, to select the monomer or monomers and the relative proportions thereof in the sheath-producing stage to produce a sheath polymer having a $T_i$ of at least 25° C., and preferably between 50° and even as high as 150° C. The swelling and subsequent removal of the swelling agent in this instance favors the formation and retention of the microvoids. The swelling may be carried out at a temperature near the $T_i$, or somewhat above it, to favor rapid penetration of the swelling agent through the sheath to swell the core and by softening the sheath, to allow the core greater freedom of expansion against the confinement by the sheath. The sheath may be further softened by the addition of plasticizers, solvents or coalescents to the dispersion, e.g., toluene, butoxyethanol or butoxyethoxyethanol. The softening agents may be used in amounts of from 1% to 20% of more of the weight of sheath polymer. After expansion by the swellant to the desired extent, the expanded particles are cooled to a temperature below their $T_i$ to set the sheath and then the swellant is removed (at least partially) from the particles by drying at the lower temperature, resulting in the formation of microvoids in the cores of the particles. For best results to obtain microvoids, it is important to remove water rapidly from the cores. Slow drying at high humidity may be detrimental to microvoid formation. If high levels of softening agent are used to enhance swelling, the sheath polymer may be too soft even at room temperature to form microvoids.

In another preferred embodiment the sheath is crosslinked by including in the monomer mixture used for forming the sheath about 1% to 50% by weight, based on the total monomer weight in the mixture, of a polyethylenically unsaturated monomer such as one of those mentioned hereinbefore for making the core polymer. The crosslinking of the sheath serves to render it more stable structurally so that on drying the swollen particles to remove swellant, the shrinkage of the swollen core produces microvoids therein but the sheath resists collapse so that the microvoids formed are essentially retained within the particle which also remains essentially in spherical shape. One method involving the formation of a crosslinked sheath is to swell the dispersed polymer-particles by neutralization of the amine-containing core just before the stage of polymerizing the crosslinked phase of the sheath, or before completion of this stage when the content of polyethylenically unsaturated monomer therein is over about 5 weight percent of the monomer mixture used therein, so that the last mentioned stage is carried out on the swollen particles and favors retention of the structure when voids are produced on subsequent removal of swellant.

In this last-mentioned embodiment wherein the sheath is crosslinked, this may be effected in a single sheath-forming stage or it may be effected by using a multistage sheath-forming procedure in which the polyethylenically unsaturated crosslinking monomer is omitted from the first sheath-forming monomer mixture but is included in the monomer mixture used in a later stage, such as the second or third stage.

The multiple-stage core-sheath polymer dispersions of the present invention are useful as opacifying agents for aqueous coating and impregnating composition, such as those of U.S. Pat. No. 2,795,564 supra, either as a supplement to, or replacement of, pigmentary matter and/or extenders therefor. For these purposes, the aqueous dispersions of the core-sheath polymer may be added directly to the coating and/or impregnating compositions. Alternatively, the core/sheath polymers may be isolated from the dispersions, after swelling of their cores, by filtration or decantation, and then the swellant may be removed, as by drying or volatilization, under conditions such that microvoids are formed and retained in the individual polymer particles or granules, the latter being more or less free-flowing in character so that they can be packaged, sold and shipped or stored before use. The dry powder thus obtained can also be used in coatings based on organic solvents provided the sheath component of the core-sheath particles is not soluble in the organic solvent.

In one modification, the base-core/sheath polymer particles having a $T_i$ of 50° C. or higher, and/or a crosslinked sheath layer may be provided with an outer uncrosslinked relatively softer, film-forming layer having a $T_i$ of about 17° to 20° C. or lower to give an opacifier such that the outer surfaces of these particles will coalesce, at their juncture with each other and/or with the main binder polymer having a $T_i$ around room temperature or lower, upon drying at normal room temperatures. When the particles comprise a hard internal (especially $T_i$ of at least 50° C. to 100° C.) internal sheath layer, the uncrosslinked relatively softer exterior layer should have a $T_i$ less than 50° C., and at least 10° C., preferably 20° C., lower than that of the hard layer. This embodiment is useful in water-base house paints and industrial coatings wherein the core/sheath polymer may serve as part of the binder when applied at ambient temperatures or at somewhat higher temperatures followed by a baking step. As stated previously swelling by acid generally requires the heating of the polymer dispersion sufficiently to allow expansion of the sheath while aiding penetration by the acid. When crosslinked sheath layer(s) is involved, the swelling by acid generally is effected prior to completion of the polymerization of the crosslinking monomer mixture.

Besides being useful in water-based paints based on vinyl or acrylic polymer latices or aqueous solutions of vinyl or acrylic polymers, to replace all or part of opacifying pigments heretofore used, especially those of titanium dioxide, the microvoid-containing particulate polymers of the present invention may be used for similar purposes in other coating systems including resin-forming condensation products of thermosetting type, such as phenoplasts and aminoplasts, including urea-formaldehyde and melamine-formaldehyde, and other condensates, e.g., water-dispersible alkyd resins. The polymers of this invention are particularly useful in acid-catalyzed thermosetting coatings. The microvoid containing particles of this invention have low density and are useful for imparting low density to coatings. Selection of the sheath-forming component may serve, as indicated hereinabove, to impart thickening action of the heteropolymers of the present invention. In addition, polymodal heteropolymers of the present invention having a predominant proportion of the microvoid-containing large mode and a relatively minor proportion of a small mode can serve not only the opacifying function of the main large mode but also provide an adhesion-promoting action by way of the small mode or modes.

In the following examples which are illustrative of the invention, the parts and percentages are by weight and temperatures are in degrees Celsius, unless otherwise stated.

EXAMPLE 1

Preparation of an amine core polymer dispersion

A 2-liter round-bottomed flask is equipped with paddle stirrer, thermometer, nitrogen inlet and reflux condenser. Deionized water (1300 g) and 33 g of 60% active quarternary ammonium cationic surfactant are stirred in the kettle at 55° C. under nitrogen atmosphere. One gram of 70% active t-butyl hydroperoxide, 3 ml of 0.15% aqueous $FeSO_4.10H_2O$, 1 ml of 1.0% aqueous ethylene diamine tetraacetic acid sodium salt and 0.10 g of sodium sulfoxylate formaldehyde (SSF) are dissolved in 5 ml of water and added to the kettle. A monomer mixture of 100 g of methyl methacrylate, 100 g of 3-(dimethylamino)propyl methacrylamide and 1.0 g of 1,3-butylene glycol dimethacrylate is pumped into the kettle at 3.3 g/min. along with 0.6 g of SSF dissolved in 25 ml of water at a rate of 0.33 g/min., maintaining a temperature of 55° C. After one hour the monomer addition is complete and in another 20 minutes the addition of the SSF solution is complete. After another 15 minutes 0.3 g of t-butyl hydroperoxide and 0.5 g of SSF dissolved in 5 ml of water is added. After another two hours 0.3 g of t-butyl hydroperoxide and 0.5 g of SSF dissolved in 5 ml of water is added again. After another 15 min., the dispersion is cooled to room temperature and filtered through a 100 mesh screen to remove 3 g of wet coagulum. The resulting dispersion has 13.9% solids, pH 9.5 and Brookfield viscosity 25 cps (2/60). A sample of dispersion when acidified with acetic acid to pH 4 increases in viscosity to 100 cps indicating that the particles are swelling.

EXAMPLE 2

A 2-liter round-bottomed flask is equipped with paddle stirrer, thermometer, nitrogen inlet and reflux condenser. Deionized water (1000 g) is stirred in the kettle at 60° C. under a nitrogen atmosphere. The unacidified core polymer dispersion from Example 1 (68 g, 13.9% solids) is added along with 2.0 g of 3-(methylacrylamide)propyl trimethylammonium chloride, 1.4 g of t-butyl hydroperoxide (70%), 3 ml of 0.15% aqueous $FeSO_410H_2O$ premixed with 1 ml of 1.0% aqueous ethylene diamine tetraacetic acid sodium salt, and 0.16 g of SSF dissolved in 5 ml of water. A monomer emulsion is prepared from 60 g of water, 1.0 g of 60% active quaternary ammonium cationic surfactant and 200 g of isobutyl methacrylate and added to the flask at 4.3 g/min. along with 0.9 g of SSF dissolved in 25 ml of water at a rate of 0.33 g/min. The reaction temperature is maintained at 60° C. throughout. After one hour the monomer emulsion addition is complete and, in another 20 min., the addition of SSF solution is finished. After another 4 minutes 0.3 g of t-butyl hydroperoxide and 0.5 g of SSF dissolved in 5 ml of water are added. After another 30 min. the dispersion is cooled and filtered to remove 300 g of wet coagulm. The filtered core/sheath dispersion has 7.9% solids, pH 8.8 and a weight average diameter of 311 nm (electron microscopy).

A sample of the core/sheath dispersion is acidified with acetic acid to pH 3.0 and heated to 75° C. for one hour to swell the particles and cooled back to room temperature. The weight average diameter is now 329 nm (electron microscopy) indicating an 18% increase in the volume of the particles. A drop of the swollen dispersion is spread on a microscope slide and allowed to dry. The dry powdery residue is wet with a hydrocarbon oil ($n_D = 1.51$) and examined by dark-field microscopy (900×). Under these conditions the sheath polymer is invisible because it has almost the same index of refraction as the hydrocarbon oil. However the void inside each particle can be seen as a bright dot with apparent diameter around 150 nm. For comparison, some of the unswollen core/sheath polymer is examined in the same way with an optical microscope: no voids are visible.

A blend of the swollen core-sheath polymer dispersion and a film-forming latex which is an acrylic (50% butyl acrylate, 50% methyl methacrylate) emulsion copolymer is made (25% core-sheath polymer on a solids basis) and is drawn down over an opacity chart (The Leneta Company, Form 5C). The wet film is dried at 30% relative humidity. The dry film (2.0 mil thick) is whitish due to the microvoids formed in the core-sheath particles. A Kubelka-Munk scattering coefficient (S) is determined by the method of P. B. Mitton and A. E. Jacobson (Off. Digest, Sept. 1963, p. 871–911) and is found to be 0.05/mil.

For comparison, the unswollen core sheath polymer dispersion is incorporated in a film in the same manner. The dry film is clear due to the absence of microvoids (S=0.00/mil).

We claim:

1. A process for making an aqueous dispersion of water-insoluble core/sheath polymer particles comprising sequentially emulsion polymerizing at a temperature of from about 10° C. to about 100° C. in an aqueous medium containing a free radical initiator:
   (a) a core monomer system comprising one or more monoethylenically unsaturated monomers at least one of which monomers having an amine group and comprising at least 5% by weight of the core monomer system, thereby forming dispersed core particles having an average diameter of from about 0.05 to 1 micron, and
   (b) polymerizing in the presence of the dispersed core particles a sheath monomer system comprising at least one monoethylenically unsaturated monomer having no ionizable group to form a sheath on the core particles, any monoethylenically unsaturated amine in the sheath monomer mixture being present in an amount of no more than 10% by weight of the sheath monomers, the proportion of amine in the sheath monomer mixture being less than ½ the proportion thereof in the core monomer mixture, the resultant core-sheath particles having an average diameter before acidification and swelling of from about 0.07 to 4.5 microns, the relative amounts of core-forming monomer(s) and sheath forming monomer(s) being such that the ratio of the weight of the core to the weight of the total polymer in the resulting dispersed particles is from about 1:4 to 1:100, said sheath being permeable to an aqueous acid and having a $T_i$ of greater than 50° C., and
   (c) neutralizing with acid so as to swell said core and form particles which, when dried, contain a single void and cause opacity in compositions in which they are contained.

2. A process according to claim 1 wherein the amine monomer in (a) is selected from the group consisting of vinylpyridine, 2-(dimethylamino)ethyl methacrylate, 2-(tert-butylamino)ethyl methacrylate, and 3-(dimethylamino)propyl methacrylamide.

3. A process according to claim 1 in which the core/sheath particles have an average diameter of from 0.2 to about 2.0 microns in unswollen condition.

4. A process according to claim 1 in which the formation of the sheath in (b) is a multistage process.

5. A process according to claim 4 wherein in at least one stage of the multistage formation of the sheath a crosslinked polymer is formed from a monomer mixture of at least one monoethylenically unsaturated monomer and about 1% to about 50% by weight of the monomer mixture of at least one polyethylenically unsaturated monomer, the core/sheath polymer being swollen by at least partial neutralization by application of acid prior to the completion of the crosslinking stage when the amount of polyethylenically unsaturated monomer exceeds about 5% by weight of the monomer mixture.

6. A process according to claim 1 in which the formation of the sheath in (b) is a multistage process comprising first forming a hard and/or crosslinked polymer sheath, then forming a soft polymer sheath of monomers selected to provide a relatively softer polymer having a $T_i$ of less than 50° C. and at least 10° C. lower than that of the hard sheath polymer.

7. A process according to claim 6 in which the $T_i$ of the polymer at the exterior surface of the particles is about 20° C.

8. A composition comprising an aqueous dispersion of water-insoluble core/sheath polymer particles have an average diameter of 0.07 to 4.5 microns, having a core polymerized from a monomer system comprising one or more monoethylenically unsaturated monomers, at least one of said unsaturated monomers having an amine group, and having at least one sheath polymerized from at least one different sheath monomer system, at least one of said different sheath monomer systems being hard and producing a sheath polymer having a $T_i$ greater than 50° C., being non film-forming at 20° C., and being permeable to acid, said core being swollen by neutralization with acid in the presence of water, said particles having a property such that when subsequently dried a single cavity forms in said core and said particles cause opacity in compositions in which they are contained.

9. A composition for coating and/or impregnating a substrate comprising a film-forming vinyl addition polymer either dissolved or dispersed in an aqueous medium and an aqueous dispersion of water insoluble core/sheath polymer particles of claim 8.

10. A composition in accordance with claim 9 wherein the film-forming vinyl addition polymer has an apparent second order transition temperature ($T_i$) of about 17° to 20° C., and the core/sheath polymer is present in a pigment volume concentration of at least 5%, and further including inorganic pigment.

11. A process comprising depositing a film of the composition according to claim 9 on a solid substrate to be coated and/or impregnated, and subsequently drying the composition forming single cavities in the core of substantially each of said particles so as to contribute to the opacity of said film.

12. Articles coated and/or impregnated with the opaque film-forming composition of claim 1.

* * * * *

UNITED STATES PATENT AND TRADEMARK OFFICE
CERTIFICATE OF CORRECTION

PATENT NO. : 4,469,825
DATED      : September 4, 1984
INVENTOR(S) : Alexander Kowalski and Martin Vogel It is certified that error appears in the above-identified patent and that said Letters Patent is hereby corrected as shown below:

In claim 12, change "claim 1" to read -- claim 9 --.

Signed and Sealed this

Twentieth Day of May 1986

[SEAL]

Attest:

DONALD J. QUIGG

Attesting Officer

Commissioner of Patents and Trademarks